United States Patent
Yonge et al.

(10) Patent No.: US 8,429,406 B2
(45) Date of Patent: Apr. 23, 2013

(54) AUTHORIZING CUSTOMER PREMISE EQUIPMENT INTO A NETWORK

(75) Inventors: Lawrence W. Yonge, Ocala, FL (US); Srinivas Katar, Gainesville, FL (US); Manjunath Krishnam, Gainesville, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 1242 days.

(21) Appl. No.: 11/970,271

(22) Filed: Jan. 7, 2008

(65) Prior Publication Data

US 2008/0301446 A1 Dec. 4, 2008

Related U.S. Application Data

(60) Provisional application No. 60/941,949, filed on Jun. 4, 2007.

(51) Int. Cl.
*H04L 29/06* (2006.01)

(52) U.S. Cl.
USPC ............... 713/171; 713/150; 713/168

(58) Field of Classification Search ............ None
See application file for complete search history.

(56) References Cited

U.S. PATENT DOCUMENTS

| | | |
|---|---|---|
| 4,578,530 A | 3/1986 | Zeidler |
| 4,689,786 A | 8/1987 | Sidhu et al. |
| 4,807,248 A | 2/1989 | Pyatt et al. |
| 5,328,530 A | 7/1994 | Semiatin et al. |
| 5,359,625 A | 10/1994 | Vander Mey et al. |
| 5,570,355 A | 10/1996 | Dail et al. |
| 5,682,428 A | 10/1997 | Johnson |
| 5,732,076 A | 3/1998 | Ketseoglou et al. |
| 6,074,086 A | 6/2000 | Yonge, III |
| 6,111,919 A | 8/2000 | Yonge, III |
| 6,141,355 A | 10/2000 | Palmer et al. |
| 6,167,137 A | 12/2000 | Marino et al. |
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 | 2/2001 | Oohara |
| 6,201,794 B1 | 3/2001 | Stewart et al. |
| 6,243,761 B1 | 6/2001 | Mogul et al. |
| 6,269,132 B1 | 7/2001 | Yonge, III |

(Continued)

FOREIGN PATENT DOCUMENTS

| | | |
|---|---|---|
| EP | 1748574 | 1/2007 |
| EP | 1748597 | 1/2007 |

(Continued)

OTHER PUBLICATIONS

Afkhamie et al., "An Overview of the upcoming HomePlug AV Standard", May 2005, IEEE 0-7803-8844-5-05, pp. 400-404.

(Continued)

*Primary Examiner* — William Goodchild
(74) *Attorney, Agent, or Firm* — DeLizio Gilliam, PLLC (57) ABSTRACT

Systems and methods for authorizing customer premise equipment into a network. A publicly available network membership key can be provided to enable initial connection to the network. Unique network membership keys associated with various customer premise equipment can be provided to enable service level access to the network and/or authorization into a sub-cell associated with the network.

41 Claims, 6 Drawing Sheets

U.S. PATENT DOCUMENTS

| | | | |
|---|---|---|---|
| 6,269,163 B1 | 7/2001 | Rivest et al. | |
| 6,272,135 B1 | 8/2001 | Nakatsugawa | |
| 6,278,685 B1 | 8/2001 | Yonge, III | |
| 6,307,940 B1 | 10/2001 | Yamamoto | |
| 6,310,892 B1 | 10/2001 | Olkin | |
| 6,388,995 B1 | 5/2002 | Gai et al. | |
| 6,519,231 B1 | 2/2003 | Ding et al. | |
| 6,574,195 B2 | 6/2003 | Roberts | |
| 6,591,364 B1 | 7/2003 | Patel | |
| 6,606,303 B1 | 8/2003 | Hassel et al. | |
| 6,631,136 B1 | 10/2003 | Chowdhury et al. | |
| 6,711,163 B1 | 3/2004 | Reid et al. | |
| 6,775,656 B1 | 8/2004 | Gettwart et al. | |
| 6,804,252 B1 | 10/2004 | Johnson | |
| 6,904,462 B1 | 6/2005 | Sinha | |
| 6,910,136 B1 | 6/2005 | Wasserman et al. | |
| 7,039,021 B1 | 5/2006 | Kokudo | |
| 7,085,284 B1 | 8/2006 | Negus | |
| 7,181,620 B1 | 2/2007 | Hur | |
| 7,234,058 B1 | 6/2007 | Baugher et al. | |
| 7,346,021 B2 | 3/2008 | Yoshizawa et al. | |
| 7,350,076 B1 | 3/2008 | Young et al. | |
| 7,352,770 B1 | 4/2008 | Yonge, III | |
| 7,369,579 B2 | 5/2008 | Logvinov et al. | |
| 7,409,543 B1 | 8/2008 | Bjorn | |
| 7,496,039 B2 | 2/2009 | Yamada et al. | |
| 7,506,042 B2 | 3/2009 | Ayyagari | |
| 7,558,294 B2 | 7/2009 | Yonge, III | |
| 7,609,681 B2 | 10/2009 | Kurobe et al. | |
| 7,756,039 B2 | 7/2010 | Yonge, III | |
| 7,797,751 B1 | 9/2010 | Hughes et al. | |
| 7,826,618 B2 | 11/2010 | Klingler et al. | |
| 7,894,487 B2 | 2/2011 | Yonge, III | |
| 7,949,356 B2 | 5/2011 | Yonge, III | |
| 8,112,358 B2 | 2/2012 | Yonge, III | |
| 8,170,051 B2 | 5/2012 | Yonge et al. | |
| 2001/0000709 A1* | 5/2001 | Takahashi et al. | 380/277 |
| 2002/0015496 A1* | 2/2002 | Weaver et al. | 380/241 |
| 2002/0025810 A1 | 2/2002 | Takayama et al. | |
| 2002/0029260 A1* | 3/2002 | Dobbins et al. | 709/219 |
| 2002/0060986 A1 | 5/2002 | Fukushima et al. | |
| 2002/0097679 A1 | 7/2002 | Berenbaum | |
| 2002/0107023 A1 | 8/2002 | Chari et al. | |
| 2002/0114303 A1 | 8/2002 | Crosbie et al. | |
| 2002/0122411 A1 | 9/2002 | Zimmerman et al. | |
| 2002/0124177 A1* | 9/2002 | Harper et al. | 713/189 |
| 2002/0137462 A1 | 9/2002 | Rankin | |
| 2002/0141417 A1 | 10/2002 | Umayabashi | |
| 2003/0012166 A1 | 1/2003 | Benveniste | |
| 2003/0018812 A1 | 1/2003 | Lakshminarayana et al. | |
| 2003/0048183 A1 | 3/2003 | Vollmer et al. | |
| 2003/0067892 A1 | 4/2003 | Beyer et al. | |
| 2003/0086437 A1 | 5/2003 | Benveniste | |
| 2003/0095551 A1 | 5/2003 | Gotoh et al. | |
| 2003/0137993 A1 | 7/2003 | Odman | |
| 2003/0193959 A1 | 10/2003 | Lui et al. | |
| 2003/0224784 A1 | 12/2003 | Hunt et al. | |
| 2003/0228846 A1 | 12/2003 | Berliner et al. | |
| 2003/0229783 A1* | 12/2003 | Hardt | 713/155 |
| 2004/0047319 A1 | 3/2004 | Elg | |
| 2004/0070912 A1 | 4/2004 | Kopp | |
| 2004/0081089 A1 | 4/2004 | Ayyagari et al. | |
| 2004/0090982 A1 | 5/2004 | Xu | |
| 2004/0165532 A1 | 8/2004 | Poor et al. | |
| 2004/0190542 A1 | 9/2004 | Ono et al. | |
| 2004/0210630 A1 | 10/2004 | Simonnet et al. | |
| 2004/0218577 A1 | 11/2004 | Nguyen et al. | |
| 2004/0234073 A1 | 11/2004 | Sato et al. | |
| 2004/0264428 A1 | 12/2004 | Choi et al. | |
| 2005/0001694 A1 | 1/2005 | Berkman | |
| 2005/0021539 A1* | 1/2005 | Short et al. | 707/100 |
| 2005/0025176 A1 | 2/2005 | Ko et al. | |
| 2005/0068227 A1 | 3/2005 | Caspi et al. | |
| 2005/0071631 A1* | 3/2005 | Langer | 713/156 |
| 2005/0089005 A1 | 4/2005 | Sakoda et al. | |
| 2005/0114489 A1 | 5/2005 | Yonge, III | |
| 2005/0117515 A1 | 6/2005 | Miyake | |
| 2005/0117750 A1* | 6/2005 | Rekimoto | 380/247 |
| 2005/0135291 A1 | 6/2005 | Ketchum et al. | |
| 2005/0147075 A1 | 7/2005 | Terry | |
| 2005/0169222 A1 | 8/2005 | Ayyagari et al. | |
| 2005/0190785 A1 | 9/2005 | Yonge, III et al. | |
| 2005/0210157 A1 | 9/2005 | Sakoda | |
| 2005/0243765 A1 | 11/2005 | Schrader et al. | |
| 2005/0249186 A1 | 11/2005 | Kelsey et al. | |
| 2006/0002406 A1 | 1/2006 | Ishihara et al. | |
| 2006/0039371 A1 | 2/2006 | Castro et al. | |
| 2006/0072517 A1 | 4/2006 | Barrow et al. | |
| 2006/0077997 A1 | 4/2006 | Yamaguchi et al. | |
| 2006/0104301 A1 | 5/2006 | Beyer et al. | |
| 2006/0159260 A1 | 7/2006 | Pereira et al. | |
| 2006/0168647 A1 | 7/2006 | Chiloyan | |
| 2006/0224813 A1 | 10/2006 | Rooholamini et al. | |
| 2006/0251021 A1 | 11/2006 | Nakano et al. | |
| 2006/0256741 A1 | 11/2006 | Nozaki | |
| 2006/0268746 A1 | 11/2006 | Wijting et al. | |
| 2007/0025244 A1 | 2/2007 | Ayyagari et al. | |
| 2007/0025384 A1 | 2/2007 | Ayyagari et al. | |
| 2007/0025391 A1 | 2/2007 | Yonge, III et al. | |
| 2007/0026794 A1 | 2/2007 | Ayyagari et al. | |
| 2007/0030811 A1 | 2/2007 | Frei et al. | |
| 2007/0053520 A1 | 3/2007 | Eckleder | |
| 2007/0058661 A1 | 3/2007 | Chow | |
| 2007/0058732 A1 | 3/2007 | Riedel et al. | |
| 2007/0060141 A1 | 3/2007 | Kangude et al. | |
| 2007/0097867 A1 | 5/2007 | Kneckt et al. | |
| 2007/0118730 A1 | 5/2007 | Platt | |
| 2007/0133388 A1 | 6/2007 | Lee et al. | |
| 2007/0133449 A1 | 6/2007 | Schacht et al. | |
| 2007/0140185 A1 | 6/2007 | Garg et al. | |
| 2007/0147322 A1 | 6/2007 | Agrawal et al. | |
| 2007/0220570 A1 | 9/2007 | Dawson et al. | |
| 2007/0271398 A1 | 11/2007 | Manchester et al. | |
| 2007/0286074 A1 | 12/2007 | Xu | |
| 2008/0002599 A1 | 1/2008 | Yau et al. | |
| 2008/0151820 A1 | 6/2008 | Solis et al. | |
| 2008/0181219 A1 | 7/2008 | Chen et al. | |
| 2008/0186230 A1 | 8/2008 | Wengler et al. | |
| 2008/0212591 A1 | 9/2008 | Wu et al. | |
| 2008/0222447 A1 | 9/2008 | Ram et al. | |
| 2008/0279126 A1 | 11/2008 | Katar et al. | |
| 2008/0298252 A1 | 12/2008 | Yonge, III | |
| 2008/0298589 A1 | 12/2008 | Katar et al. | |
| 2008/0298590 A1 | 12/2008 | Katar et al. | |
| 2008/0298594 A1 | 12/2008 | Yonge, III | |
| 2008/0301052 A1 | 12/2008 | Yonge, III et al. | |
| 2008/0310414 A1 | 12/2008 | Yonge, III | |
| 2009/0010276 A1 | 1/2009 | Yonge, III | |
| 2009/0011782 A1 | 1/2009 | Yonge, III et al. | |
| 2009/0034552 A1 | 2/2009 | Yonge, III | |
| 2009/0040930 A1 | 2/2009 | Yonge, III et al. | |
| 2009/0067389 A1 | 3/2009 | Lee et al. | |
| 2009/0074007 A1 | 3/2009 | Yonge, III | |
| 2009/0106551 A1 | 4/2009 | Boren et al. | |
| 2009/0116461 A1 | 5/2009 | Yonge, III | |
| 2009/0154487 A1 | 6/2009 | Ryan et al. | |
| 2009/0311963 A1 | 12/2009 | Haverty | |
| 2010/0014444 A1 | 1/2010 | Ghanadan et al. | |
| 2010/0091760 A1 | 4/2010 | Yoon | |
| 2010/0100724 A1 | 4/2010 | Kaliski, Jr. | |
| 2012/0072715 A1 | 3/2012 | Yonge, III | |

FOREIGN PATENT DOCUMENTS

| | | |
|---|---|---|
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |
| WO | WO9857439 A1 | 12/1998 |
| WO | WO02103943 A1 | 12/2002 |
| WO | WO03100996 A2 | 12/2003 |
| WO | WO2004038980 A2 | 5/2004 |

OTHER PUBLICATIONS

European Search Report—EP09178487, Search Authority, Munich Patent Office, Jan. 21, 2010.

Faure, Jean-Philippe et al., Call for Submissions. Draft Standard for Broadband over Power Line Networks: Medium Access Control and Physical Layer Specifications. Feb. 14, 2007, 4 pages.

Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.

HomePlug Powerline Alliance Inc., "HomePlug AV White Paper," Doc. Ver. No. HPAVWP—050818, Aug. 2005, pp. 1-11.

International Search Report and Written Opinion—PCT/US2008/065811, International Searching Authority, European Patent Office, Nov. 25, 2008.

International Search Report and Written Opinion—PCT/US2008/065831, International Searching Authority, European Patent Office, Feb. 20, 2009, 22 pages.

Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 Powerline Communication LANs-Protocol Description and Performance Results version 5.4," 2000, International Journal of Communication Systems, 2000 00: 1-6, pp. 1-25.

Loh et al, Quality of Support and priority Management in HomePNA 2.0 Link Layer, IEEE, 6 pages, 2003.

Notification of First Office Action, The State Intellectual Property Office of the People's Republic of China, issued in Chinese Application No. 200610107587.1, dated Oct. 11, 2010, 6 pages.

Notification of Reasons for Rejection, Japanese Patent Office, issued in Japanese Patent Application No. 2006-205200, dated Jan. 18, 2011, 3 pages.

Opera Specification-Part 1: Technology, Open PLC European Research Alliance, 198 pages, 1006.

"U.S. Appl. No. 11/970,297 Final Office Action", Apr. 16, 2012, 32 pages.

"U.S. Appl. No. 12/133,301 Office Action", Mar. 1, 2012, 38 pages. Co-pending U.S. Appl. No. 13/113,474, filed May 23, 2011, 32 pages.

"U.S. Appl. No. 11/970,297 Office Action", Mar. 30, 2011, 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/970,339 Final Office Action", Jul. 7, 2011, 14 pages.
"U.S. Appl. No. 11/970,339 Office Action", Jan. 19, 2011, 22 pages.
"U.S. Appl. No. 11/970,339 Office Action", Jun. 18, 2012, 26 pages.
"U.S. Appl. No. 11/971,446 Office Action", Feb. 15, 2011, 20 pages.
"U.S. Appl. No. 11/971,446 Final Office Action", Jul. 1, 2011, 17 pages.
"U.S. Appl. No. 12/108,334 Final Office Action", Jun. 14, 2011, 28 pages.
"U.S. Appl. No. 12/108,334 Office Action", Feb. 16, 2011, 26 pages.
"U.S. Appl. No. 12/108,334 Office Action", Aug. 3, 2010, 20 pages.
"U.S. Appl. No. 12/108,334 Office Action", Aug. 3, 2012, 18 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Final Office Action", Mar. 22, 2011, 39 pages.
"U.S. Appl. No. 12/133,301 Office Action", Sep. 22, 2010, 42 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Final Office Action", Jun. 9, 2011, 38 pages.
"U.S. Appl. No. 12/133,315 Final Office Action", Jul. 20, 2010, 30 pages.
"U.S. Appl. No. 12/133,315 Office Action", Aug. 9, 2012, 37 pages.
"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 12/133,325 Final Office Action", Dec. 9, 2010, 33 pages.
"U.S. Appl. No. 12/133,325 Office Action", May 27, 2010, 31 pages.
"European Search Report—EP09178487, Search Authority, Munich Patent Office", Jan. 21, 2010, 2 pages.
"U.S. Appl. No. 12/133,301 Final Office Action", Sep. 26, 2012, 54 pages.
"U.S. Appl. No. 12/133,301 Office Action", Mar. 1, 2012, 38 pages.
Muir A., et al., "An Efficient Packet Sensing MAC Protocol for Wireless Networks", Computer Engineering Department School of Engineering, University of California, Aug. 1998, pp. 20.
U.S. Appl. No. 13/303,913 Office Action, Dec. 26, 2012, 37 pages.
U.S. Appl. No. 11/970,339 Final Office Action, Dec. 11, 2012, 25 pages.
Notification of First Office Action, The State Intellectual Property Office of the People's Republic of China, issued in Chinese Application No. 200880100486.9, Nov. 21, 2012, 11 pages.

\* cited by examiner

AUTHORIZING CUSTOMER PREMISE EQUIPMENT INTO A NETWORK

RELATED APPLICATIONS

This application is a utility of U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to authorization of customer premise equipment into a network.

BACKGROUND

Several communication systems use a shared medium for exchange of information. Examples of such communication systems include HomePlug AV based powerline communication systems, IEEE 802.11 based wireless communications systems and DOCSIS based cable modem system. Due to the shared nature of the medium, signals transmitted in these systems can also be received by unauthorized device. To protect privacy and to prevent rogue devices from accessing the network, these systems incorporate security. Secure systems use authorization process to determine if the device can be admitted into the network. Remote authentication dial in user service (RADIUS) is an example of common authorization system. Authorized devices are provided with the encryptions keys that are used to encryption information transmitted over the medium, thus protecting privacy of the information. Advanced Encryption Standard (AES) is another encryption mechanism used by various communication systems.

SUMMARY

The following are various aspects described herein. In various implementations, systems, methods, apparatuses and computer program products are provided. In an example, methods are disclosed, which include: providing a public network membership key associated with a network; receiving a connection request encrypted using the public network membership key from a device; permitting limited access to the network from the device based on the connection request being encrypted using the public network membership key; exchanging registration information from a user associated with the device; and, providing a unique network membership key based on receipt of the registration information.

Example systems can include a network termination unit, a registration system and an authorization server. The network termination unit can receive a network connection request from a customer premise equipment (CPE) device and can provide limited access to the CPE device based upon the network connection request being encrypted using a public network membership key. The registration system can enable exchange of registration information with a user associated with the CPE device. The authorization server can provide a unique network membership key based upon receipt of customer registration information, and can instruct the network termination unit and an associated headend station to provide limited access to the network based upon the public network membership key while providing service level access based upon the unique network membership key and a unique identifier associated with the customer premise equipment device.

Other example authorization methods can include: receiving a connection request encrypted using the public network membership key from a device, the connection request comprising a unique identifier associated with the device; determining that the device is authorized for service level access based upon the unique identifier; retrieving a device access key associated with the unique identifier; and, providing a unique network membership key encrypted using the retrieved device access key.

Other implementations and examples will be found in the detailed description, drawings and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
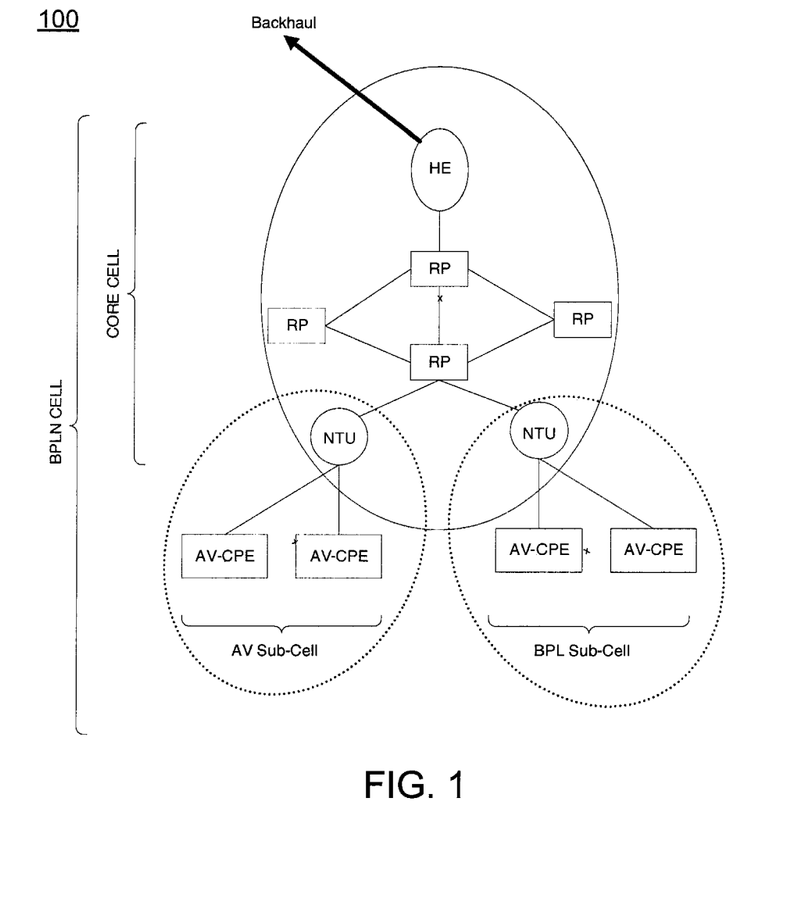
FIG. 1 is a schematic diagram of a communication network.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of applications including, smart grid management, broadband internet access, voice and video delivery services, etc. In various implementations, BPLN can be deployed on low voltage, medium voltage and high voltage power lines. Additionally, BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more cells. A cell is a group of broadband power line (BPL) devices in a BPLN that have similar characteristics such as association management, security, QoS and channel access settings, for example. Cells in a BPLN are logically isolated from each other, and communication to and from the backhaul occurs within the cell. Each cell in a BPLN includes a core-cell and may also include one or more sub-cells. There can be more than one cell on a given physical power line medium.

A core-cell includes a group of devices in a BPLN that includes a head end (HE), repeaters (R), and network termination units (NTU), but can exclude customer premise equipment (CPE). The head end (HE) is a device that bridges a cell to the backhaul network. At a given time, a cell will have one active head end and the head end manages the cell including the core-cell and any associated sub-cells. A repeater (RP) is a device that selectively retransmits media access control (MAC) service data units (MSDUs) to extend the effective range and bandwidth of the BPLN cell. Repeaters can also perform routing and quality of service (QoS) functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint nodes in the network and such devices can communicate with other nodes in the network through the NTU.

Each node in the network communicates as a communication "station" (STA) using a PHY layer protocol that is used by the nodes to send transmissions to any other stations that are close enough to successfully receive the transmissions. STAs that cannot directly communicate with each other use one or more repeater STAs to communicate with each other. Any of a variety of communication system architectures can be used to implement the portion of the network interface module that converts data to and from a signal waveform that is transmitted over the communication medium. An application running on a station can provide data to and receives data from the network interface module. A MSDU is a segment of information received by the MAC layer. The MAC layer can process the received MSDUs and prepares them to generate "MAC protocol data units" (MPDUs). A MPDU is a segment of information including header and payload fields that the MAC layer has asked the PHY layer to transport. An MPDU can have any of a variety of formats based on the type of data being transmitted. A "PHY protocol data unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. A preferred implementation of the MAC and PHY layers used by powerline medium is that based on HomePlug AV specification.

One implementation of the PHY layers is to use OFDM modulation. In OFDM modulation, data are transmitted in the form of OFDM "symbols." Each symbol has a predetermined time duration or symbol time $T_S$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_S$. Equivalently, each carrier frequency is an integral multiple of a frequency interval $\Delta f=1/T_S$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_l$ and $f_N$ referred to as the OFDM bandwidth.

Figure 2:
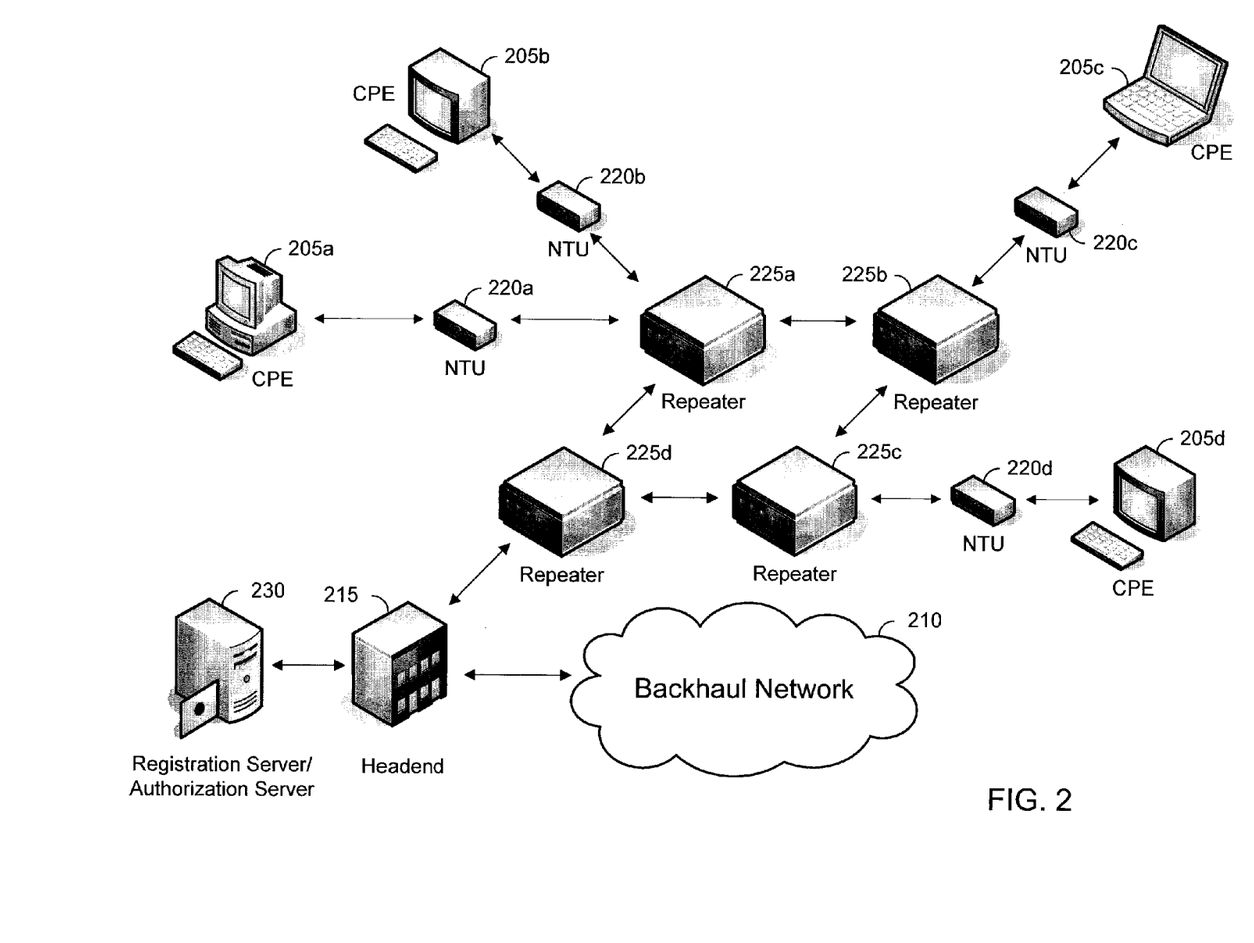
FIG. 2 is a block diagram of a powerline communication network.

FIG. 2 is a block diagram of a powerline communication network. In various implementations, a powerline communication network can enable customer premises 30 equipment (CPE) devices 205a-d to access a backhaul network 210 through a gateway (e.g., a headend 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205a-d can communicate with the headend 215 through a network of network termination units 220a-d and repeaters 225a-d. In some implementations, the network termination units can operate to translate the data signals from the CPE devices in any of a variety of communications protocols onto a powerline network. For example, a CPE 205a-d might communicate with an NTU 220a-d using a IEEE 802.11 wireless protocol, and the NTU 220a-d can convert the wireless signal to a signal suitable for transmission on a powerline medium.

In various implementations, repeaters 225a-d can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225a-d can be equipped to transfer the signal from the powerline network to the backhaul network 210.

In some implementations, the headend 215 can also include an authorization server. A preferred implementation is to have the Authorization Server on the Backhaul Network 210. The authorization server can be operable to authenticate CPE devices 205a-d for transmission of data over the powerline network. When a CPE device 205a-d is not authenticated, in various implementations, the CPE device 205a-d can be provided access to a registration server 230. The registration server 230, in various implementations, can enable the user of a CPE device 205a-d to register the CPE device 205a-d with the network to obtain access to the powerline network.

In various implementations, the registration server 230 can provide a limited registration to a CPE device 205a-d to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans.

For example, an access plan might allow a user to purchase access for a specified period of time, at a specified bandwidth, or combinations thereof. In some implementations the registration server and authorization server can be co-located as shown in FIG. 2. In additional implementations, the registration server can be part of the backhaul network 201. In other implementations, the registration server might not be co-located with the authorization server.

Figure 3:
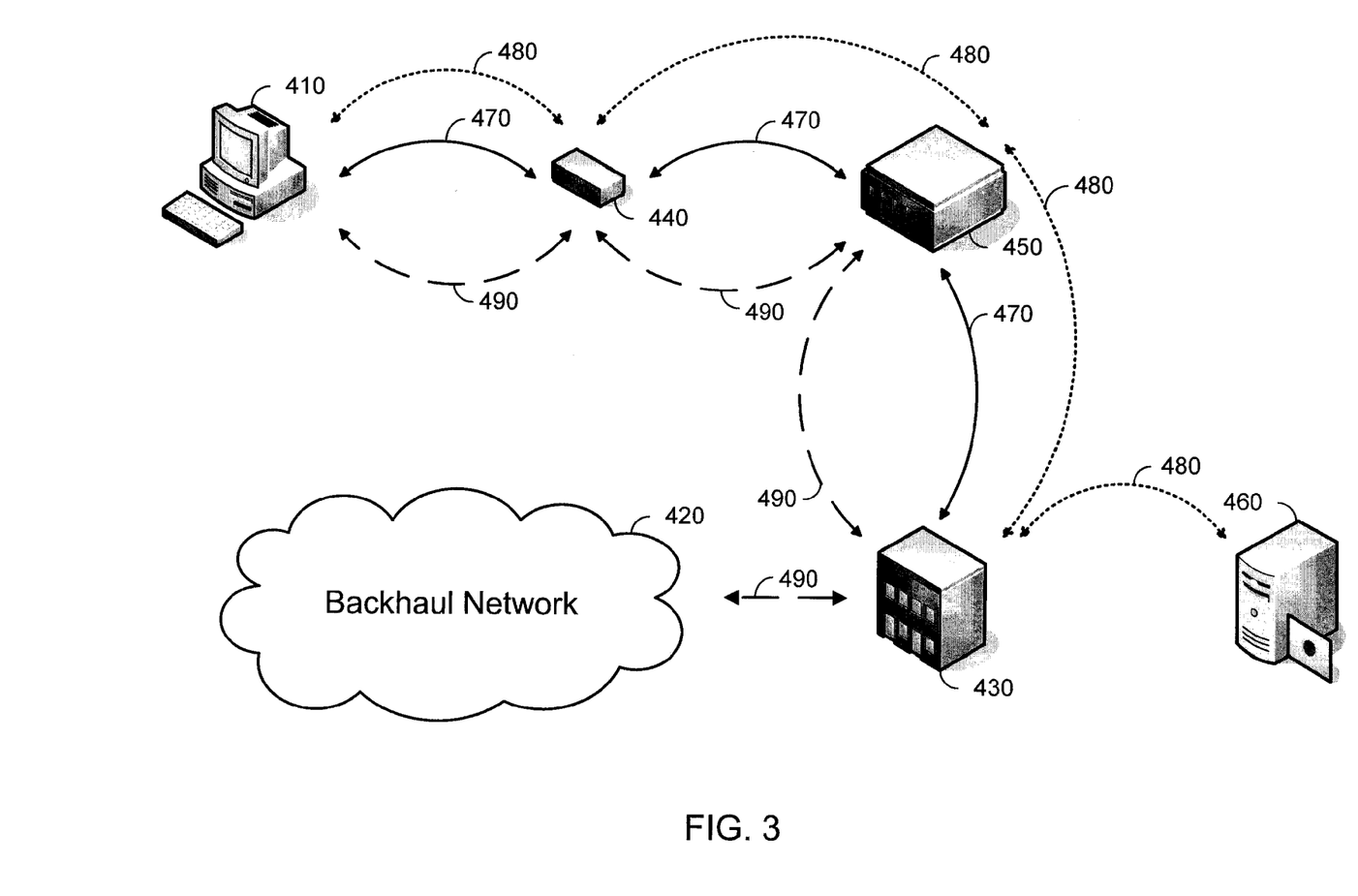
FIG. 3 is a block diagram illustrating a process for authorizing a new customer premise equipment device into a network.

FIG. 3 is a block diagram illustrating a process for authorizing a new customer premise equipment device into a network. A CPE device 410 can request access to a backhaul network 420 from a headend 430. The CPE device can communicate with the headend 430 through an NTU 440 and one or more repeaters 450. In various implementations, when the CPE device 410 is a new device, the CPE device 410 can communicate a connection request 470 to the headend 430. The headend 430 can determine whether the CPE device is authorized to use the network based upon the connection request. In various examples, the connection request can be encrypted using a publicly available network management key (NMK). In various examples, the NTU 440 can also be configured to recognize the new CPE device 410 based on connection request encrypted with a publicly available NMK and can communicate a connection request 470 to the headend 430 on behalf of the CPE device 410.

In various implementations, based upon receipt of a connection request using the publicly available NMK, the headend 430 can provide access to a registration server 460. The registration server 460 can enable the user of the CPE device 410 to provide further information 480 to obtain further access to the powerline network or to the backhaul network 420. In some implementations, the headend 430 can authorize the CPE device 410 for limited access 490 to the backhaul network 420 based upon receiving the publicly available NMK. In various implementations, the NTU can be configured to provide limited access to new CPE devices without sending an explicit connection request to the HE.

In some implementations, the connection request from the CPE device 410 is unencrypted. In such implementations, the headend 430 can provide the CPE device 410 with the publicly available NMK, thereby enabling the CPE device 410 to access limited services through the powerline network, including, for example, the registration server 460.

In some implementations, once a user has registered the CPE device 410, the CPE device 410 can be provided access 490 to the backhaul network 420. In various implementations, the access 490 to the backhaul network 420 can be limited based upon a service level subscribed to by the user of the CPE device 410. The access 490 can be limited for example by the NTU 440, the headend 430, or a combination thereof.

Figure 4:
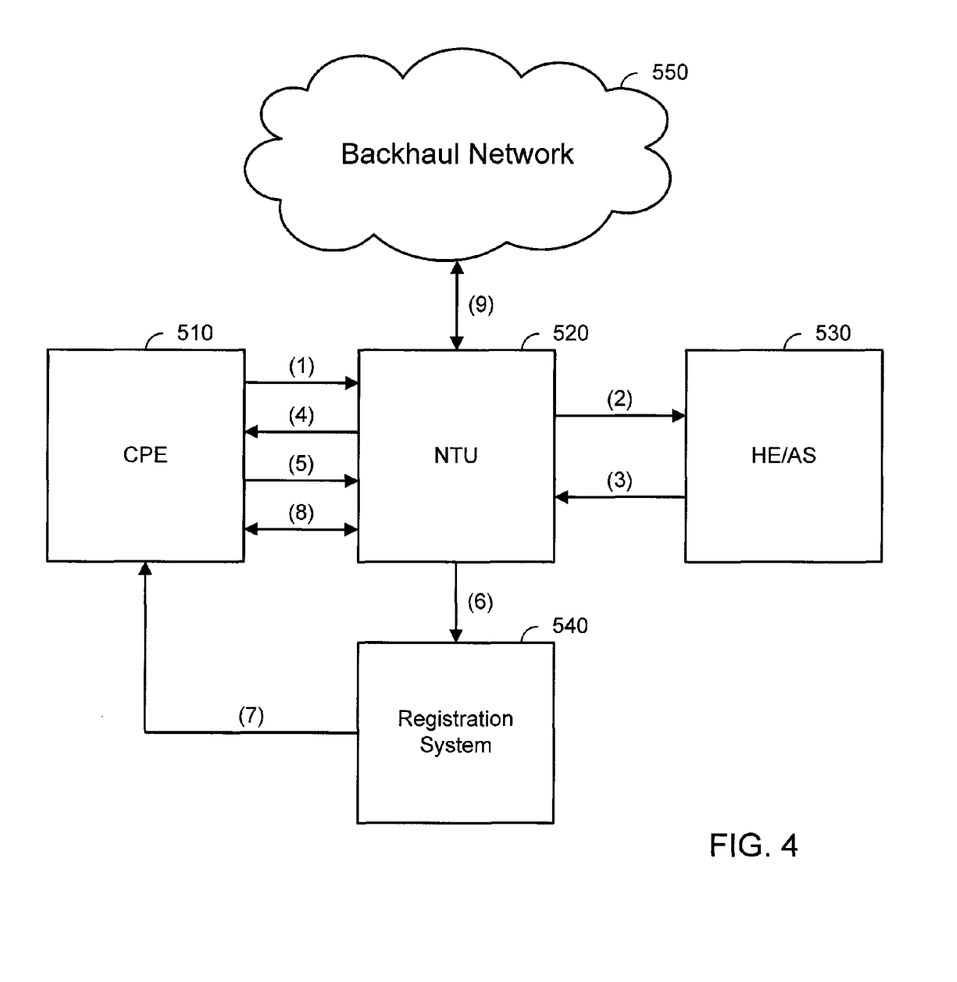
FIG. 4 is a block diagram illustrating the communication flow associated with authorizing a new customer premise equipment device into a network.

FIG. 4 is a block diagram illustrating the communication flow associated with authorizing a new customer premise equipment device into a network. A flow can include a CPE device 510, an NTU 520, a headend (HE) or authorization server (AS) 530, a registration server 540 and a backhaul network 550. As shown by signal (1), when a new CPE device 510 attempts to join the network, the device 510 sends a connection request to the NTU 520. Because the NTU 520 does not recognize the new device 510, the NTU 520 forwards the request to the headend or authorization server 530 for authorization, as shown at signal (2).

The headend or authorization server 530 can determine whether the device is authorized to use the network based upon the connection request. For example, if the connection request is encrypted using a publicly available network management key (NMK), the device can be approved for limited access to the network. The publicly available NMK can be distributed using any of a variety of distribution schemes. For example, a website associated with a powerline network can provide the key, the headend can provide the publicly available key upon receiving a connection request, the key can be e-mailed, communicated by telephone, etc.

Upon authorizing the new device 510 using the publicly available NMK, the headend 530 can notify the NTU 520 that the device 510 is approved for limited access as shown at signals (3) and (4). The NTU 520 can then limit the access of the CPE device 510 to certain destinations, specified bandwidth or a specified period of time. In some implementations, a period of free usage can be provided and the network can require the user to register to receive additional service at the end of the period of free usage.

In FIG. 4, the CPE device 510 can send a registration request to the NTU 520 as shown at signal (5). The NTU 520 can forward the registration request to the registration server 540 as shown at signal (6). In various implementations, the registration information can be provided securely to the registration server 540, such as, for example, using a secure hypertext transfer protocol (HTTPS), encrypted e-mail, or another secure transfer protocol. Upon receipt of the registration information, the registration server 540 can provide the CPE device 510 with a unique NMK as shown by signal (7).

In various implementations, the unique NMK can enable the CPE device 510 to associate with a sub-cell of the powerline network. In some examples, association with a sub-cell of the network enable the CPE device 510 to communicate with the backhaul network 550 using the NTU 520, as shown by signals (8) and (9).

Figure 5:
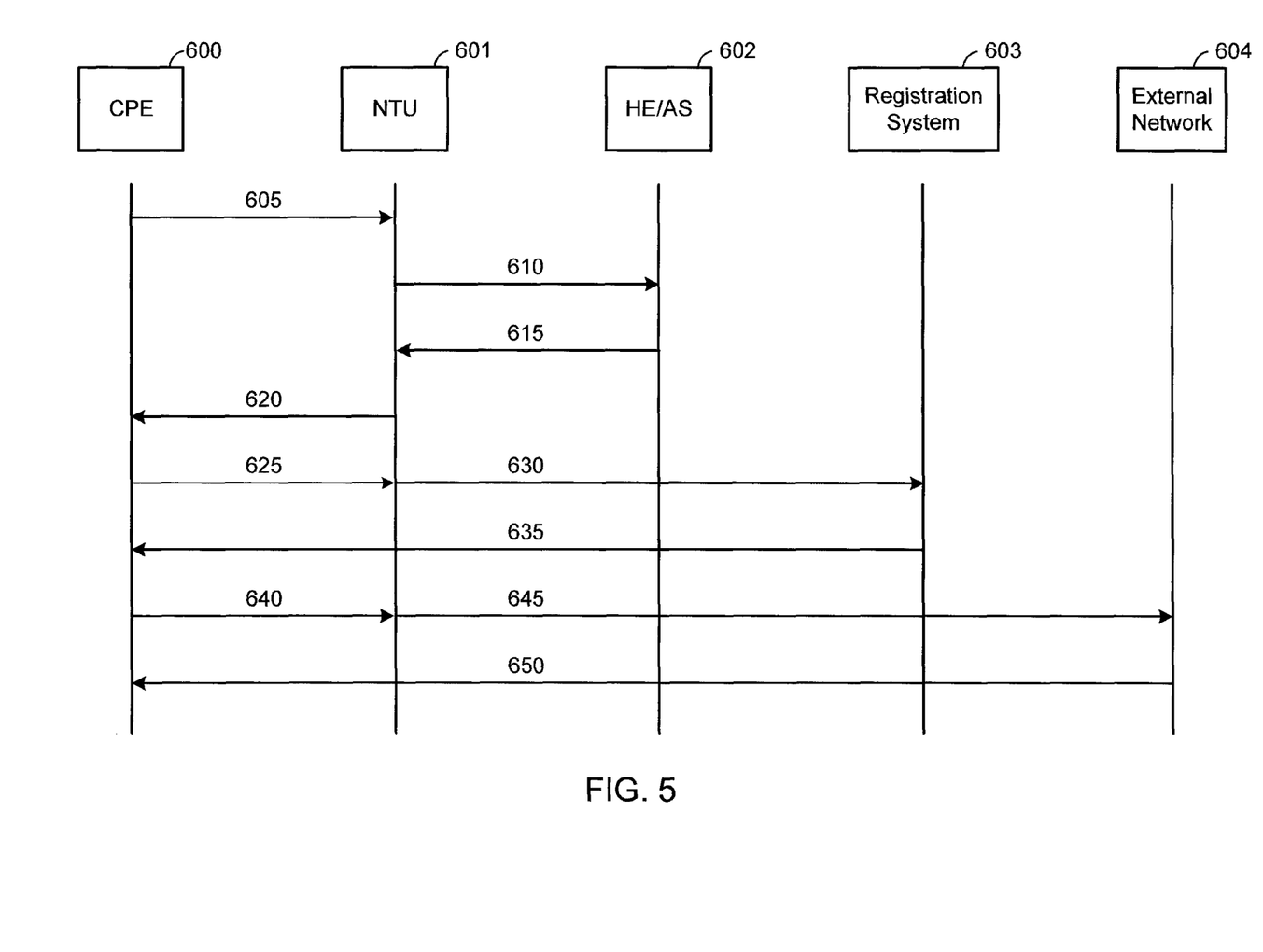
FIG. 5 is a flow diagram depicting an example flow for authorization of a device into a centrally managed network.

FIG. 5 is a flow diagram depicting an example flow for authorization of a CPE device into a centrally managed network. A CPE device can be authorized for limited access to a network based upon presentation of a publicly available network membership key (NMK). The limited access can provide a user with an opportunity to register for service level access to the network. In some implementations, the limited access can provide access to the device for a limited period of time before requiring registration and payment. In other implementations, the limited access can be bandwidth limited access, allowing the user to register and pay for a higher bandwidth service. Other provisions of limited access service are possible.

In some implementations, anew CPE device 600 (e.g., AV-CPE or BPL-CPE of FIG. 1) can join a network using a publicly available NMK. In these implementations, an NTU 601 can receive a network connection request from the CPE device 600 as shown by signal 605. In some implementations, the network connection request can be encrypted using a publicly available NMK. The publicly available NMK can be used to enable the user to gain limited access to the network. For example, the publicly available NMK can be used to enable a user to register a device for service by providing a registration page to the user. In some implementations, the publicly available NMK can be distributed through a website. Other distribution systems are possible.

The NTU 601 can forward the connection request to a headend (HE) or to an authorization server (AS) 602 as shown by signal 610. In various implementations the authorization server can provide centralized management of authorization (e.g., providing the NMK to an authorized device) and authentication (e.g., providing the NEK for a station with a valid NMK). In other implementations, distributed management of authorization and authentication can be provided, for example, using multiple headend devices. In further implementations, the forwarded connection request can be encrypted using the publicly available NMK. In other implementations, the connection request can be encrypted using a network encryption key (NEK) prior to forwarding the connection request to the HE or AS.

In some implementations, the HE or AS 602 can provide the publicly available NMK to the NTU as shown by signal 615. In other implementations, the NTU can include the ability to recognize the publicly available NMK and merely provides notification of the use of the publicly available NMK to the HE or AS 602.

The NTU can approve the connection request based on the response from the HE or AS 602 as shown by signal 620. The CPE device 600 can then begin communicating with the NTU 601 as shown by signal 625. In some implementations, the NTU can filter the data received from the CPE device based on the provision of limited access to the CPE device using the publicly available NMK. For instance, in some implementations, the NTU 601 might only allow access to a registration system 603 as shown by signal 630 based upon the CPE device being connected to the network using the publicly available NMK.

In some implementations, the NTU 601 and/or the AS or HE 602 can provide limited access to content including providing access only to content provided by the service provider or content provided by the registration system 603. In other implementations, access to the network using the public NMK can be limited to a certain amount of time. In still further implementations, packets communicated to the network by a CPE device using the public NMK can be tagged by the NTU 601. The tags can be used by network stations to specify special handling (e.g., low priority, high priority, bandwidth restrictions, etc.) for packets that have been marked using the tags.

In some implementations, the registration system 603 can provide a registration site to the user, enabling the user to submit registration information to obtain a service level access. In some implementations, data can be exchanged using various secure communications mechanisms, such as, for example, a secure hypertext transfer protocol (HTTPS). The registration information, in some implementations, can include payment information. In further implementations, the registration information can also include service level information (e.g., which level of service the user wants to purchase). In still further implementations, the registration information can include a device access key communicated using a secure communication protocol to the registration system 603.

Registration for service level access can include registering for any of several service levels, each of the service levels providing varying levels of service based upon the registration information provided by the user. For example, a user might be want to purchase 10 Mbps service for a day, while another user might want to purchase 5 Mbps service for a month. The service levels can be monitored and administered by the NTU 601 in conjunction with the HE or AS 602.

Once registration information is received, the HE or AS 602 can provide the CPE device 600 with a unique NMK as shown by signal 635. In some implementations (and as described throughout this application), the unique NMK is substantially unique. For example, there may be two identical NMKs. However, the identical NMKs are uniquely associated with a unique identifier (e.g., a MAC address) such that the combination of the NMK and the MAC address is unique. The unique NMK can be encrypted using a device access key (DAK) associated with the CPE device 600. The DAK key can be obtained during an initial registration process, and can be used to maintain secrecy of the unique NMK. Upon receipt of the unique NMK, the CPE device 600 can be associated with the NTU 601 by a sub-cell (e.g., sub-net).

The CPE device 600 can then communicate with an external network 604 (e.g., the internet) through the NTU 601 as shown by signals 640 and 645. The NTU can provide service throttling based on a service level associated with the CPE device 600 as identified by the unique NMK. The external network 604 can also communicate information to the CPE device 600, for example, based on requests issued by the CPE device 600, as shown by signal 650.

Figure 6:
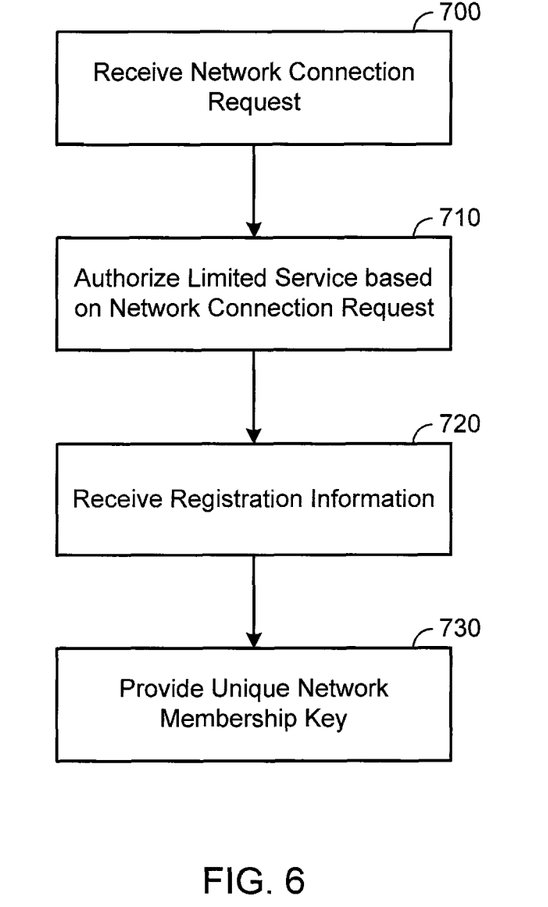
FIG. 6 is a flowchart illustrating an example authorizing a device into a network.

FIG. 6 is a flowchart illustrating an example authorizing a device into a network using a public NMK. At stage 700, a network connection request is received. The network connection request can be received, for example, by an NTU (e.g., NTU 220 of FIG. 2). In some implementations, the network connection request can be encrypted. The encryption can be performed by a CPE device requesting connection to the network.

At stage 710, limited service can be authorized based on the network connection request. In various embodiments, limited service can be authorized, for example, by a NTU (e.g., NTU 220 of FIG. 2), by a headend (e.g., headend 215 of FIG. 2), or by a central authorization server. In some implementations, the network connection request can be authorized based on the encryption key used to encrypt the network connection request. For example, if the network connection request is encrypted using a publicly available NMK, the CPE device can be provided limited access to the network. Limited access, in some implementations, includes a registration site that the user can user to submit registration and/or payment information for service level access.

At stage 720, registration information can be received. Registration information can be received, for example, by a headend (e.g., headend 215 of FIG. 2) or by an authorization server. The registration information, in some implementations, can include payment information associated with the user. Registration information can also include a device access key associated with the CPE device.

At stage 730, a unique NMK can be provided. The unique NMK can be provided, for example, by a headend device (e.g., headend 215 of FIG. 2) or an authorization server. In some implementations, the unique NMK can be encrypted using a device access key associated with the CPE device prior to communicating the unique NMK to the device. In some implementations, the unique NMK can be used by the NTU to identify a service level associated with the CPE device. For example, the user might only register the device for one day of service. Thus, the unique NMK might only provide service for a day. In other examples, the user might register the device for monthly service and register for a limited bandwidth. Thus, the NTU can limit the bandwidth available to the CPE device based upon the unique NMK. In still further examples, the user can specify certain types of traffic to be provided (e.g., business related traffic). The NTU can then filter other types of traffic. Other service levels are possible.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A computer implemented authorization method, comprising:
   providing a public network membership key associated with a network;
   receiving a connection request encrypted using the public network membership key from a device;
   permitting limited access to the network from the device based on the connection request being encrypted using the public network membership key, wherein the limited access comprises limiting content accessible by a user associated with the device, wherein the content accessible by the user comprises a registration site used to exchange registration information;
   receiving, during a device registration process, registration information from the user associated with the device, wherein the registration information comprises payment information and service level information, wherein the service level information indicates at least one of a plurality of types of service to be provided to the device; and
   providing a unique network membership key based on receipt of the registration information.

2. The method of claim 1, further comprising:
   encrypting the unique network membership key prior to transmitting the unique network membership key.

3. The method of claim 2, wherein the unique network membership key is encrypted using a device access key.

4. The method of claim 3, further comprising receiving the device access key prior to an authorization server providing the unique network membership key.

5. The method of claim 4, further comprising using a secure mechanism to receive the device access key.

6. The method of claim 5, wherein the secure mechanism comprises a secure hypertext transfer protocol.

7. The method of claim 5, wherein the secure mechanism comprises an IP security protocol.

8. The method of claim 2, wherein the unique network membership key is provided to the device using a secure transmission mechanism.

9. The method of claim 8, wherein the secure transmission mechanism comprises a high layer protocol.

10. The method of claim 9, wherein the high layer protocol comprises a secure hypertext transfer protocol.

11. The method of claim 9, wherein the high layer protocol comprises an IP security protocol.

12. The method of claim 1, further comprising:
    receiving a packet encrypted using the unique network membership key;
    using at least a portion of the network to communicate the packet to a destination associated with the packet.

13. The method of claim 12, wherein the at least a portion of the network comprises a broadband over powerline network.

14. The method of claim 1, wherein the unique network membership key is associated with the device by an authorization system using a unique identifier associated with the device.

15. The method of claim 14, wherein the unique identifier comprises a media access control address.

16. The method of claim 1, wherein the network is a broadband over powerline network.

17. The method of claim 1, wherein the unique network membership key is a substantially unique network membership key.

18. The method of claim 1, wherein the limited access comprises:
    tagging one or more packets originating from the device; and
    handling the one or more tagged packets differently from packets that are not tagged.

19. The method of claim 1, wherein the limited access comprises limiting a duration of time during which the device can access the network.

20. The method of claim 1, wherein the limited access comprises limiting a bandwidth associated with the device accessing the network.

21. The method of claim 1, further comprising periodically rotating the unique network membership key.

22. The method of claim 1, further comprising:
receiving a second connection request encrypted using the unique network membership key; and
determining whether a media access control address associated with the second connection request matches a known media access control address;
providing a service level based upon the determination and based upon the unique network membership key received.

23. The method of claim 1, further comprising binding a service level to the unique network membership key and a media access control address associated with the device.

24. The method of claim 1, wherein the public network membership key is publicly available.

25. The method of claim 1, wherein the public network membership key is available from a web site.

26. An authorization system comprising:
a network termination unit operable to receive a network connection request from a customer premise equipment device, the network termination unit being operable to provide limited access to the customer premise equipment device based upon the network connection request being encrypted using a public network membership key, wherein the limited access comprises limiting content accessible by a user associated with the customer premise equipment device, wherein the content accessible by the user comprises a registration site used to exchange registration information;
a registration system operable to exchange registration information with the user associated with the customer premise equipment device, wherein the registration information comprises payment information associated with the user of the customer premise equipment device and service level information, wherein the service level information indicates at least one of a plurality of types of service to be provided to the customer premise equipment device;
an authorization server operable provide a unique network membership key based upon receipt of customer registration information and to instruct the network termination unit and an associated headend station to provide limited access to the network based upon the public network membership key and to provide a service level access based upon the unique network membership key and a unique identifier associated with the customer premise equipment device.

27. The authorization system of claim 26, wherein the authorization server provides the unique network membership key associated with the customer premise equipment device to the network termination unit in an encrypted format using a network termination unit network membership key.

28. The authorization system of claim 27, wherein the authorization server is operable to periodically rotate the unique network membership key.

29. The authorization system of claim 27, wherein the network termination unit uses the network membership key to authorize the customer premise equipment device into a sub-network associated with the network termination unit.

30. The authorization system of claim 26, wherein the authorization server is operable to instruct the network termination unit and the associated headend station to provide different service levels based upon the unique network membership key and the unique identifier.

31. The authorization system of claim 30, wherein the provision of different service levels is based upon a combination of the unique network membership key and a media access control address associated with the customer premise equipment device.

32. The authorization system of claim 26, wherein the authorization server is operable to encrypt the unique network membership key using a device access key associated with the customer premise equipment device.

33. The authorization system of claim 32, wherein the device access key is received by the authorization server prior to the authorization server providing the public network membership key.

34. The authorization system of claim 26, wherein the authorization server is operable to determine that the network connection request is encrypted using the public network membership key based upon a media access control address associated with the network connection request.

35. The authorization system of claim 26, wherein the headend station includes a gateway from a broadband over powerline network to a packet switched network.

36. An authorization method comprising:
receiving a first connection request encrypted using a public network membership key from a device, the first connection request comprising a unique identifier associated with the device;
determining that the device is authorized for service level access based upon the unique identifier based, at least in part, on registration information received from a user associated with the device, wherein the registration information comprises payment information and service level information, wherein the service level information indicates at least one of a plurality of types of service to be provided to the device;
retrieving a device access key associated with the unique identifier;
providing a unique network membership key encrypted using the retrieved device access key;
receiving, from the device, a second connection request encrypted using the unique network membership key, the second connection request comprising the unique identifier associated with the device;
determining whether the unique identifier received in the second connection request from the device matches a known unique identifier;
providing the service level access to the device based on determining that the unique identifier received in the second connection request from the device matches a known unique identifier and based upon the unique network membership key received in the second connection request.

37. The authorization method of claim 36, further comprising receiving the first connection request at an authorization server via a network termination unit.

38. The authorization method of claim 36, wherein the device is a network termination unit sending the first connection request on behalf of a customer premise equipment device, and an authorization server is operable to encrypt the unique network membership key using the device access key associated with the network termination unit.

39. One or more non-transitory machine-readable storage media, having instructions stored therein, which when executed by one or more processors causes the one or more processors to perform operations that comprise:

providing a public network membership key associated with a network;

receiving a connection request encrypted using the public network membership key from a device;

permitting limited access to the network from the device based on the connection request being encrypted using the public network membership key, wherein the limited access comprises limiting content accessible by a user, wherein the content accessible by the user comprises a registration site used to exchange registration information;

receiving, during a device registration process, registration information from the user associated with the device, wherein the registration information comprises payment information and service level information, wherein the service level information indicates at least one of a plurality of types of service to be provided to the device; and providing a unique network membership key based on receipt of the registration information.

40. The machine-readable storage medium of claim 39, wherein the operations further comprise:

receiving a second connection request encrypted using the unique network membership key; and determining whether a media access control address associated with the second connection request matches a known media access control address;

providing a service level based upon the determination and based upon the unique network membership key received.

41. The machine-readable storage medium of claim 39, wherein the operations further comprise binding a service level to the unique network membership key and a media access control address associated with the device.

* * * * *